(12) United States Patent
Sawa

(10) Patent No.: US 11,836,773 B2
(45) Date of Patent: Dec. 5, 2023

(54) TROPHY AND CARD PRINTING KIOSK APPARATUS

(71) Applicant: Takamichi Sawa, Torrance, CA (US)

(72) Inventor: Takamichi Sawa, Torrance, CA (US)

( * ) Notice: Subject to any disclaimer, the term of this patent is extended or adjusted under 35 U.S.C. 154(b) by 517 days.

(21) Appl. No.: 16/990,061

(22) Filed: Aug. 11, 2020

(65) Prior Publication Data

US 2022/0051305 A1    Feb. 17, 2022

(51) Int. Cl.
  *G06Q 30/0601*    (2023.01)
  *B29C 64/25*      (2017.01)
  *G06Q 20/18*      (2012.01)
  *B33Y 50/02*      (2015.01)
  *G06F 30/12*      (2020.01)
  *B29C 64/393*     (2017.01)
  *B33Y 30/00*      (2015.01)
  *G06F 17/00*      (2019.01)

(52) U.S. Cl.
  CPC ......... *G06Q 30/0621* (2013.01); *B29C 64/25* (2017.08); *B29C 64/393* (2017.08); *B33Y 50/02* (2014.12); *G06F 30/12* (2020.01); *G06Q 20/18* (2013.01); *G06Q 30/0643* (2013.01); *B33Y 30/00* (2014.12)

(58) Field of Classification Search
  CPC .............. G06Q 30/0621; G06Q 20/18; G06Q 30/0643; B29C 64/25; B29C 64/393; B33Y 50/02; B33Y 50/00; B33Y 30/00; G06F 30/12; G07F 17/42
  See application file for complete search history.

(56) References Cited

U.S. PATENT DOCUMENTS

| | | | |
|---|---|---|---|
| 4,244,582 A | 1/1981 | Raees | |
| 5,615,123 A | 3/1997 | Davidson | |
| 6,546,400 B1 | 4/2003 | Aberson | |
| D600,285 S | 9/2009 | Derringer | |
| 8,089,655 B2 | 1/2012 | Elarde | |
| 8,842,156 B1* | 9/2014 | Alekhin | G07F 17/16 348/14.02 |
| 2004/0103055 A1 | 5/2004 | Butler | |
| 2007/0061762 A1 | 3/2007 | Hymel | |
| 2016/0012465 A1* | 1/2016 | Sharp | G06Q 20/321 705/14.17 |
| 2016/0292710 A1* | 10/2016 | Casselle | G06Q 30/0211 |
| 2018/0018651 A1* | 1/2018 | Nelson | G07F 17/26 |
| 2019/0213832 A1* | 7/2019 | Tsutsui | G07F 17/3225 |
| 2020/0258343 A1* | 8/2020 | Forutanpour | G07F 7/005 |

* cited by examiner

*Primary Examiner* — Quoc A Tran

(57) ABSTRACT

A trophy and card printing kiosk apparatus for creating secure and customizable cards and trophies associated with digital games and other databases includes a kiosk body with a CPU coupled within the kiosk body. A touch screen, a display screen, a payment card reader, and a card printer are coupled to a body front side of the kiosk body and are in operational communication with the CPU. A data transceiver and a memory card are coupled within the kiosk body and are in operational communication with the CPU. The data transceiver sends and receives data with a data base and a smartphone app. A power source is coupled to the kiosk body and is in operational communication with the CPU.

8 Claims, 5 Drawing Sheets

TROPHY AND CARD PRINTING KIOSK APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to printing device and more particularly pertains to a new printing device for creating secure and customizable cards and trophies associated with digital games and other databases.

(2) Description of Related Art Including Information Disclosed Under 37 CFR 1.97 and 1.98

The prior art relates to printing devices such as mobile card and photo printing kiosks, as well as 3D printers. Existing devices do not integrate with databases such as online games and do not have security features to produce cards that can be tracked and identified to ensure validity.

BRIEF SUMMARY OF THE INVENTION

An embodiment of the disclosure meets the needs presented above by generally comprising a kiosk body having a body front side, a body back side, a body left side, a body right side, a body top side, and a body bottom side. A base is coupled to the body bottom side. A CPU is coupled within the kiosk body. A touch screen, a display screen, a payment card reader, and a card printer are coupled to the body front side of the kiosk body and are in operational communication with the CPU. A data transceiver and a memory card are coupled within the kiosk body and are in operational communication with the CPU. The data transceiver is configured to send and receive data with a data base and a smartphone app. A power source is coupled to the kiosk body and is in operational communication with the CPU.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
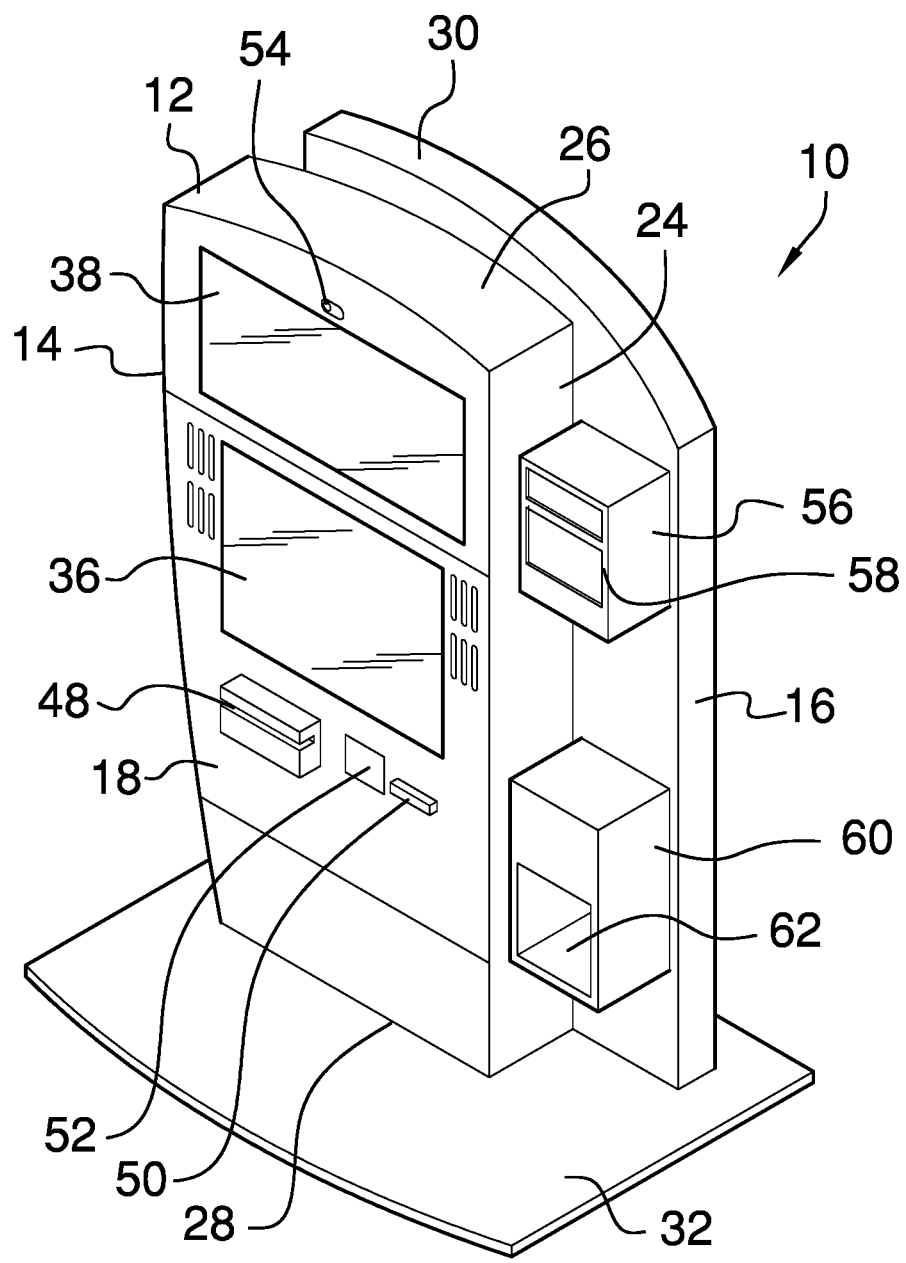
FIG. 1 is an isometric view of a trophy and card printing kiosk apparatus according to an embodiment of the disclosure.
Figure 2:
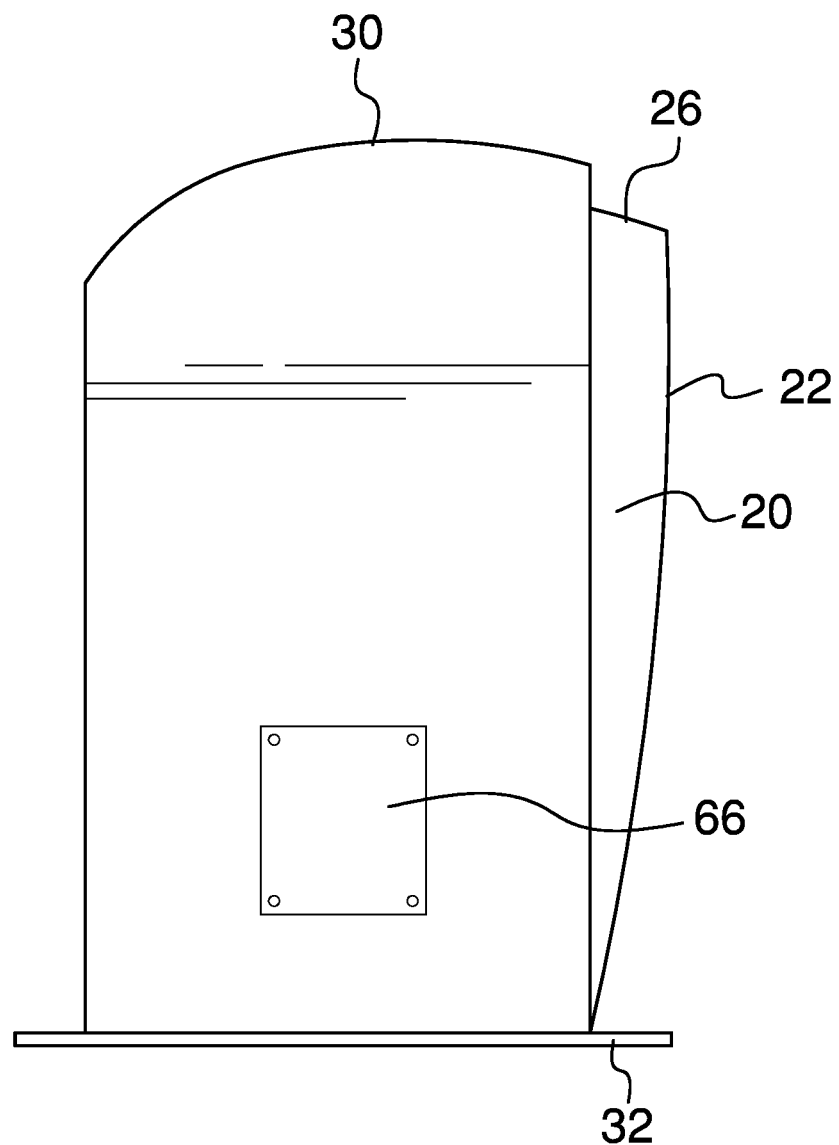
FIG. 2 is a rear elevation view of an embodiment of the disclosure.
Figure 3:
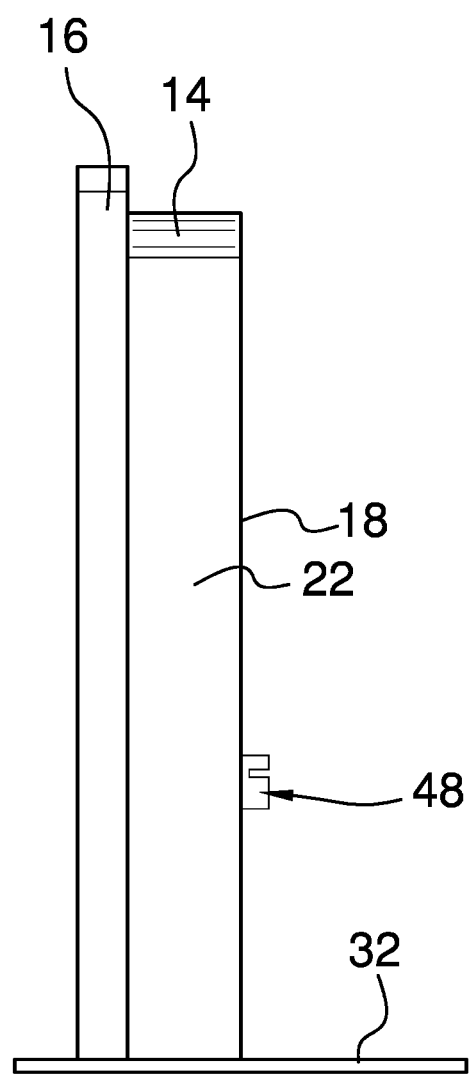
FIG. 3 is a side elevation view of an embodiment of the disclosure.
Figure 4:
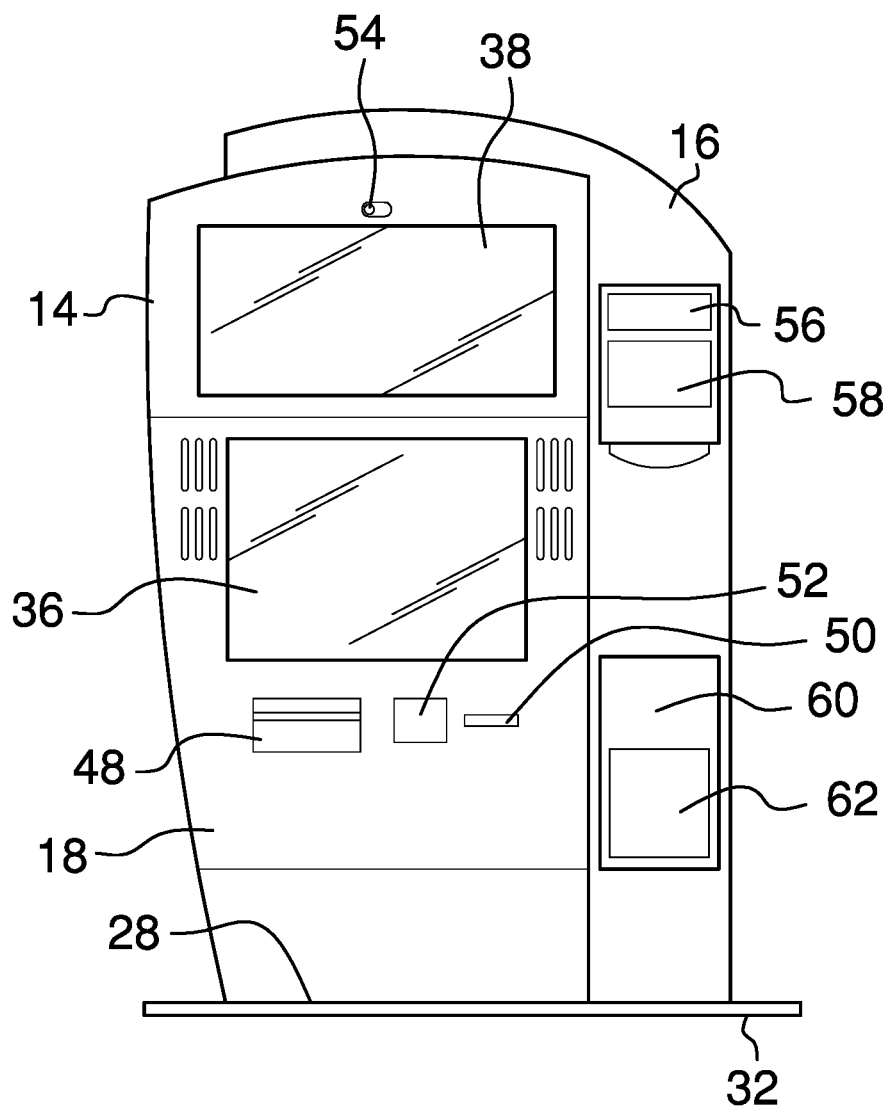
FIG. 4 is a front elevation view of an embodiment of the disclosure.
Figure 5:
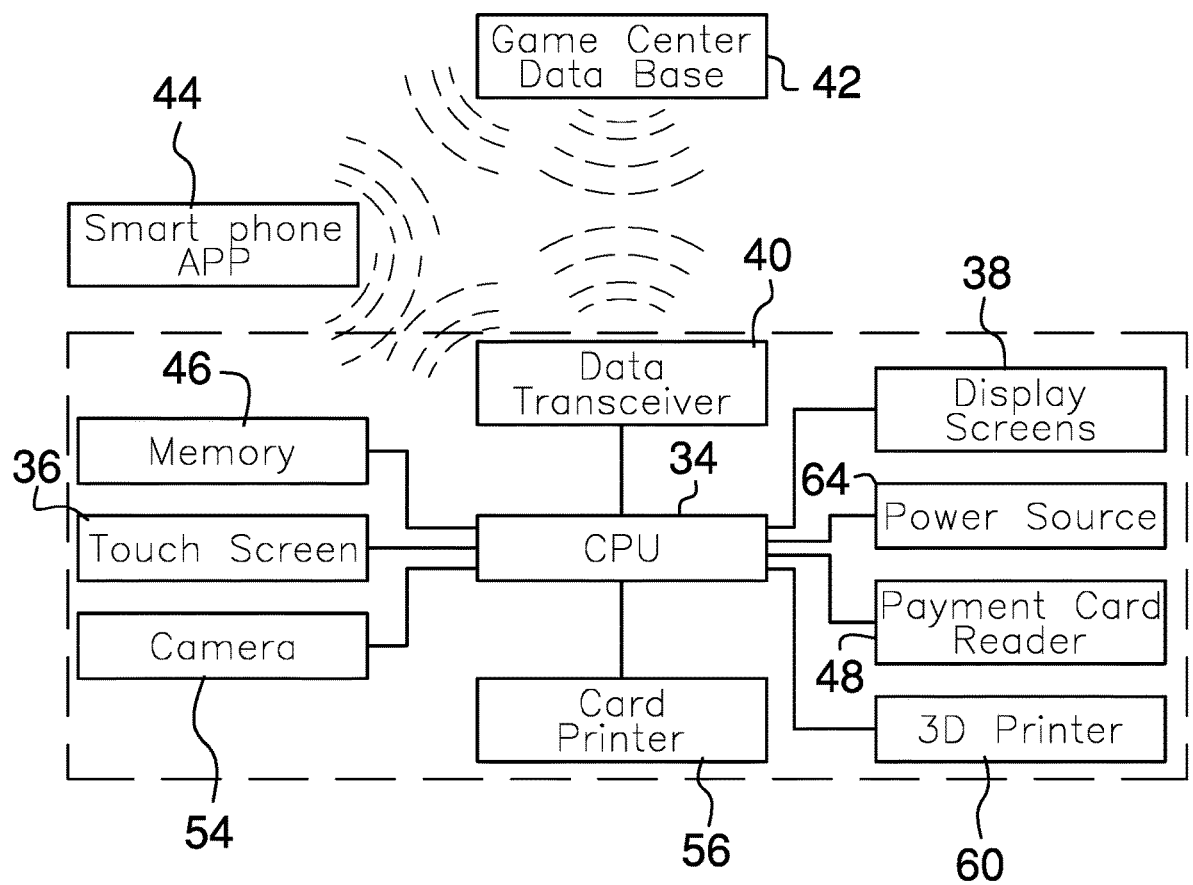
FIG. 5 is a block diagram of an embodiment of the disclosure.

With reference now to the drawings, and in particular to FIGS. 1 through 5 thereof, a new printing device embodying the principles and concepts of an embodiment of the disclosure and generally designated by the reference numeral 10 will be described.

As best illustrated in FIGS. 1 through 5, the trophy and card printing kiosk apparatus 10 generally comprises a kiosk body 12 including a main portion 14 and a rear support portion 16. The main portion 12 has a body front side 18, a body back side 20, a body left side 22, a body right side 24, a body top side 26, and a body bottom side 28. The rear support portion 16 is coupled to the body back side 20 of the main portion and may extend past the body right side 24 and the body top side 26. An upper edge 30 of the rear support portion 16 may be curved. A base 32 may be coupled to the body bottom side 28.

A CPU 34 is coupled within the kiosk body 12. A touch screen 36 is coupled to the body front side 18 and is in operational communication with the CPU 34. A display screen 38 is coupled to the body front side 18 and is in operational communication with the CPU 34.

A data transceiver 40 is coupled within the kiosk body 12 and is in operational communication with the CPU 34. The data transceiver 40 is configured to send and receive data with a data base 42 and a smartphone app 44. The touch screen 36 can thus be used to create a design for a card or a trophy incorporating information from the data base 42 and the smartphone app 44. The data base 42 and the smartphone app 44 can be linked with video games, trading games, ticketing services, personal identification, business cards, cryptocurrencies and the like. A memory card 46 is coupled within the kiosk body 12 and is in operational communication with the CPU 34 to keep record of designs that are made and printed.

A payment card reader 48 is coupled to the body front side 18 and is in operational communication with the CPU 34 to accept payment before printing the created design. A bill input 50 and change dispenser 52 may also be coupled to the body front side 18 to allow for use of paper money.

A camera 54 is coupled to the body front side 18 and is in operational communication with the CPU 34. The user may thus include a current photograph on the media being printed. The camera 54 may also be used for facial recognition for added security.

A card printer 56 is coupled to the kiosk body 12. The card printer 56 may be coupled to the rear support portion 16 adjacent the body right side 24. The card printer 56 has a card delivery port 58 and is in operational communication with the CPU 34. The card printer 56 may print an individual readable code such as, but not limited to, a QR code, a UPC code, or the like on each item printed. The card printer 56 may also have an integrated laminator. The card printer 56 may thus print an official, secure, and individualized card. The memory card 46 and the data transceiver 40 can keep track of the number of cards printed for reprints.

A 3D printer 60 may also be coupled to the kiosk body 12. The 3D printer 60 may be coupled to the rear support portion 16 below the card printer 56. The 3D printer 60 has a trophy delivery port 62. The 3D printer 60 is in operational communication with the CPU 34 to print trophies and figurines. The user may interact with the touch screen 36 to access available trophies based on his or her performance in the games associated with the data base 42 or the smartphone app 44.

A power source 64 is coupled to the kiosk body 12 and is in operational communication with the CPU 34. The body back side 20 or the rear support portion 16 may have a removable access panel 66. The access panel 66 selectively exposes the power source 64 to allow connection to a hardwire in the ground so an ill-intentioned user cannot disconnect the power.

In use, the touch screen 36 is used to select and manipulate designs on that are previewed on the display screen 38. Available designs are dependent on the user's information verified with the data base 42 and the smartphone app 44. The user then makes payment with the payment card reader 48 or the bill input 50 and retrieves the printed product from the card delivery port 58 or the trophy delivery port 62.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trophy and card printing kiosk apparatus comprising:
   a kiosk body having a body front side, a body back side, a body left side, a body right side, a body top side, and a body bottom side;
   a base coupled to the body bottom side;
   a CPU coupled within the kiosk body;
   a touch screen coupled to the body front side of the kiosk body, the touch screen being in operational communication with the CPU;
   a display screen coupled to the body front side of the kiosk body, the display screen being in operational communication with the CPU;
   a data transceiver coupled within the kiosk body, the data transceiver being in operational communication with the CPU, the data transceiver being configured to send and receive data with a data base and a smartphone app;
   a memory card coupled within the kiosk body, the memory card being in operational communication with the CPU;
   a payment card reader coupled to the body front side of the kiosk body, the payment card reader being in operational communication with the CPU;
   a card printer coupled to the body front side of the kiosk body, the card printer being in operational communication with the CPU, wherein the card printer having an integrated laminator;
   a camera coupled to the body front side of the kiosk body, the camera being in operational communication with the CPU, the camera being positioned proximate the body top side above the display screen wherein the camera is positioned and configured for capturing an image of a user and configured for facial recognition of the user;
   a 3D printer coupled to the body front side of the kiosk body, the 3D printer being in operational communication with the CPU, wherein the 3D printer having a trophy delivery port; and
   a power source coupled to the kiosk body, the power source being in operational communication with the CPU.

2. The trophy and card printing kiosk apparatus of claim 1 further comprising the card printer having a card delivery port.

3. The trophy and card printing kiosk apparatus of claim 1 further comprising the body back side having a removable access panel, the access panel selectively exposing the power source to allow connection.

4. The trophy and card printing kiosk apparatus of claim 1 further comprising the card printer printing an individual readable code on each item printed.

5. The trophy and card printing kiosk apparatus of claim 1 further comprising the kiosk body including a main portion and a rear support portion, the card printer being coupled to the rear support portion.

6. The trophy and card printing kiosk apparatus of claim 5 further comprising the rear support portion being coupled to the body back side of the main portion and extending past the body right side and the body top side.

7. The trophy and card printing kiosk apparatus of claim 6 further comprising an upper edge of the rear support portion being curved.

8. A trophy and card printing kiosk apparatus comprising:
a kiosk body including a main portion and a rear support portion, the main portion having a body front side, a body back side, a body left side, a body right side, a body top side, and a body bottom side, the rear support portion being coupled to the body back side of the main portion and extending past the body right side and the body top side, an upper edge of the rear support portion being curved;
a base coupled to the body bottom side;
a CPU coupled within the kiosk body;
a touch screen coupled to the body front side of the kiosk body, the touch screen being in operational communication with the CPU;
a display screen coupled to the body front side of the kiosk body, the display screen being in operational communication with the CPU;
a data transceiver coupled within the kiosk body, the data transceiver being in operational communication with the CPU, the data transceiver being configured to send and receive data with a data base and a smartphone app;
a memory card coupled within the kiosk body, the memory card being in operational communication with the CPU;
a payment card reader coupled to the body front side of the kiosk body, the payment card reader being in operational communication with the CPU;
a camera coupled to the body front side of the kiosk body, the camera being in operational communication with the CPU, the camera being positioned proximate the body top side above the display screen wherein the camera is positioned and configured for capturing an image of a user and configured for facial recognition of the user;
a card printer coupled to the kiosk body, the card printer being coupled to the rear support portion adjacent the body right side, the card printer having a card delivery port, the card printer being in operational communication with the CPU, the card printer printing an individual readable code on each item printed, the card printer having an integrated laminator;
a 3D printer coupled to the kiosk body, the 3D printer being coupled to the rear support portion below the card printer, the 3D printer having a trophy delivery port, the 3D printer being in operational communication with the CPU; and
a power source coupled to the kiosk body, the power source being in operational communication with the CPU, the body back side having a removable access panel, the access panel selectively exposing the power source to allow connection.

\* \* \* \* \*